(12) United States Patent
Lim et al.

(10) Patent No.: US 8,002,104 B2
(45) Date of Patent: Aug. 23, 2011

(54) METHOD AND APPARATUS FOR CHANGING ORIENTATION OF A CONTAINER

(75) Inventors: Lay-Swee Lim, Burnaby (CA); Zhong-Xu Su, Burnaby (CA); Hei Shek Ma, West Vancouver (CA)

(73) Assignee: Northwestern Systems Corporation (CA)

( * ) Notice: Subject to any disclaimer, the term of this patent is extended or adjusted under 35 U.S.C. 154(b) by 189 days.

(21) Appl. No.: 12/540,741

(22) Filed: Aug. 13, 2009

(65) Prior Publication Data
US 2011/0038700 A1  Feb. 17, 2011

(51) Int. Cl.
*B65G 47/24* (2006.01)
(52) U.S. Cl. .......................................... 198/406; 198/403
(58) Field of Classification Search .................. 198/402, 198/403, 406, 409
See application file for complete search history.

(56) References Cited

U.S. PATENT DOCUMENTS

| | | | | | |
|---|---|---|---|---|---|
| 1,519,154 | A | * | 12/1924 | Mitton | 198/403 |
| 1,739,995 | A | * | 12/1929 | Turner | 198/406 |
| 2,141,883 | A | * | 12/1938 | Simmons | 198/406 |
| 3,874,740 | A | * | 4/1975 | Hurd | 198/402 |
| 4,907,686 | A | * | 3/1990 | Cotic | 198/403 |
| 5,460,843 | A | * | 10/1995 | Greene | 426/392 |
| 5,771,840 | A | * | 6/1998 | Pelletier | 119/452 |

* cited by examiner

*Primary Examiner* — James R Bidwell
(74) *Attorney, Agent, or Firm* — Kilpatrick, Townsend & Stockton LLP.; M. Henry Heines

(57) ABSTRACT

A method and apparatus for changing orientation of a container to facilitate subsequent processing of the container is disclosed. The apparatus includes a ramp having a first end and a second end. The ramp is disposed to receive the container from the feed path in a first orientation and to cause the container to slide down the ramp toward the second end of the ramp. The apparatus also includes an obstruction located at the second end of the ramp. The obstruction is configured to contact a leading edge of the container to arrest a sliding motion of the container down the ramp. The ramp is configured to pivot to impart an angular acceleration to the container to provide sufficient angular momentum to cause a center of gravity of the container to move past the leading edge causing the container to change orientation such that the container is received on the discharge path in a second orientation.

33 Claims, 3 Drawing Sheets

METHOD AND APPARATUS FOR CHANGING ORIENTATION OF A CONTAINER

BACKGROUND OF THE INVENTION

1. Field of Invention

This invention relates generally to automated processing and more particularly to changing an orientation of a container.

2. Description of Related Art

Many scientific laboratories or life science facilities run scientific experiments on a continuous basis and may utilize re-usable containers that require thorough washing and drying prior to re-use. One example of such containers are the cages used to house rodents or other small animals for use in live-animal experimentation. Simple rodent cages are fabricated as shoebox sized polycarbonate bins that are received in a rack system when housing the live-animal. A bedding material is used to at least partially cover the floor of the cage when holding the rodent. The rodents may be relocated to a clean cage having fresh bedding, at which time the soiled cage would be washed, dried, and new bedding would be dispensed into the cage.

Laboratories conducting extensive live-animal experiments may make use of a tunnel washer for washing and drying cages and a bedding dispenser for apply new bedding material in the containers. Conventional tunnel washers have a conveyor belt running between a load section of the washer and an unload section of the dryer. The cages (or other containers being washed) are stacked side by side in a first orientation with an open side face down on a loading portion of the conveyor belt and the cages are conveyed through a series of washing, rinsing and drying sections, before discharging the cages. Having the cages in a first orientation with an open side face down facilitates effective washing and drying of the cages.

In order to re-utilize the cages, the floor of the cages must again be at least partially covered with bedding material before housing the live animals. Since an orientation of cages exiting the tunnel dryer is generally open side down, the cages must be re-oriented open side up prior to facilitate receiving the bedding material from an automated bedding dispenser.

There remains a need for apparatus and methods for re-orienting articles such as rodent cages or other containers.

SUMMARY OF THE INVENTION

In accordance with one aspect of the invention there is provided an apparatus for changing orientation of a container moving between a feed path and a discharge path to facilitate subsequent processing of the container. The apparatus includes a ramp having a first end and a second end. The ramp is disposed to receive the container from the feed path in a first orientation and to cause the container to slide down the ramp toward the second end of the ramp. The apparatus further includes an obstruction located at the second end of the ramp. The obstruction is configured to contact a leading edge of the container to arrest a sliding motion of the container down the ramp. The ramp is configured to pivot to impart an angular acceleration to the container to provide sufficient angular momentum to cause a center of gravity of the container to move past a point of support causing the container to change orientation such that the container is received on the discharge path in a second orientation.

The first end of the ramp may be configured to engage a leading edge of a subsequent container to prevent the subsequent container from being received on the ramp while the container is changing orientation.

The apparatus may also include a fence portion depending from the first end of the ramp, the fence portion being configured to obstruct the feed path when the ramp is pivoted.

The feed path may include a discharge conveyor of a dryer apparatus.

The apparatus may also include a transition ramp disposed between the feed path and the ramp.

The discharge path may include an upwardly inclined discharge path.

The ramp may be configured to pivot about a pivot axis located between the first and second ends of the ramp.

The apparatus may further include a rotating cam having a projection operable to engage an underside of the ramp to cause the ramp to pivot.

The projection may be configured to engage a cam follower mounted on the underside of the ramp.

The cam may include a cam surface having a generally circular portion and an eccentric portion that acts as the projection. The apparatus may also include a bearing mounted on the ramp that is configured to bear on the cam surface.

The rotating cam may include a cam disposed on a shaft to be rotated at a rotational speed to cause the pivoting of the ramp to occur at a time interval corresponding to a range of sizes of containers.

The apparatus may further include a controller configured to control a rotational speed of the rotation shaft in response to user input to cause the pivoting of the ramp to occur at the time interval.

A trailing edge and the leading edge of the container may be disposed on opposite sides of the pivot axis such that sufficient momentum is imparted to a trailing portion of the container to cause the change in orientation.

The obstruction may include a generally upwardly oriented lip configured to engage a portion of a surface of the container adjacent the leading edge.

In accordance with another aspect of the invention there is provide an apparatus for changing orientation of a container moving between a feed path and a discharge path to facilitate subsequent processing of the container. The apparatus includes means for receiving the container from the feed path in a first orientation at a first end of a ramp, the ramp being disposed to cause the container to slide down the ramp toward a second end of the ramp. The apparatus also includes means for arresting a sliding motion of the container down the ramp and means for causing the ramp to pivot to impart sufficient angular momentum to the container about a point of support to cause the container to change orientation such that the container is received on the discharge path in a second orientation.

In accordance with another aspect of the invention there is provide a method for changing orientation of a container moving between a feed path and a discharge path to facilitate subsequent processing of the container. The method involves receiving the container from the feed path in a first orientation at a first end of a ramp, the ramp being disposed to cause the container to slide down the ramp toward a second end of the ramp. The method further involves causing a sliding motion of the container down the ramp to be arrested at an obstruction located at the second end of the ramp, the obstruction being disposed to contact a leading edge of the container. The method also involves causing the ramp to pivot to impart an angular acceleration to the container to provide sufficient angular momentum to cause a center of gravity of the container to move past a point of support causing the container to change orientation such that the container is received on the discharge path in a second orientation.

Causing the ramp to pivot may involve simultaneously causing the first end of the ramp to engage a leading edge of a subsequent container to prevent the subsequent container from being received on the ramp while the container is changing orientation.

Causing the first end of the ramp to engage the leading edge of the subsequent container may involve causing a fence portion depending from the first end of the ramp to obstruct the feed path when the ramp is pivoted.

Receiving the container may involve receiving the container from a feed path comprising a discharge conveyor of a dryer apparatus.

Receiving the container may involve receiving the container on a transition ramp disposed between the feed path and the ramp.

Causing the container to be received on the discharge path may involve causing the container to be received on an upwardly inclined discharge path.

Causing the ramp to pivot may involve causing the ramp to pivot about a pivot axis located between the first and second ends of the ramp.

Causing the ramp to pivot may involve causing a projecting portion of a rotating cam to engage an underside of the ramp.

Causing the projecting portion of the rotating cam to engage the underside of the ramp may involve causing the projecting portion to engage a cam follower mounted on the underside of the ramp.

The cam may include a cam surface having a generally circular portion and an eccentric portion, the eccentric portion acting as the projecting portion. Causing the projecting portion to engage the cam follower may involve causing a bearing mounted on the ramp to bear on the cam surface.

Causing the projecting portion of the rotating cam to engage the underside of the ramp may involve causing a cam disposed on a shaft to be rotated at a rotational speed to cause the pivoting of the ramp to occur at a time interval corresponding to a range of sizes of containers.

Causing the pivoting of the ramp to occur at the time interval may involve controlling a rotational speed of the rotation shaft in response to user input.

Imparting sufficient angular momentum to the container about the leading edge may involve causing the container to be arrested such that a trailing edge and the leading edge of the container are disposed on opposite sides of the pivot axis such that sufficient momentum is imparted to a trailing portion of the container to cause the change in orientation.

Causing the sliding motion of the container to be arrested at the obstruction may involve causing the sliding motion of the container to be arrested at a generally upwardly oriented lip configured to engage a portion of a surface of the container adjacent the leading edge.

Imparting the angular acceleration to the container may involve controlling a rate of acceleration of the ramp to provide the angular momentum.

The method may further involve controlling a time interval between successively causing the ramp to pivot to impart the acceleration, the time interval selected to provide sufficient time for the container to change orientation.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention.

DETAILED DESCRIPTION

Figure 1:
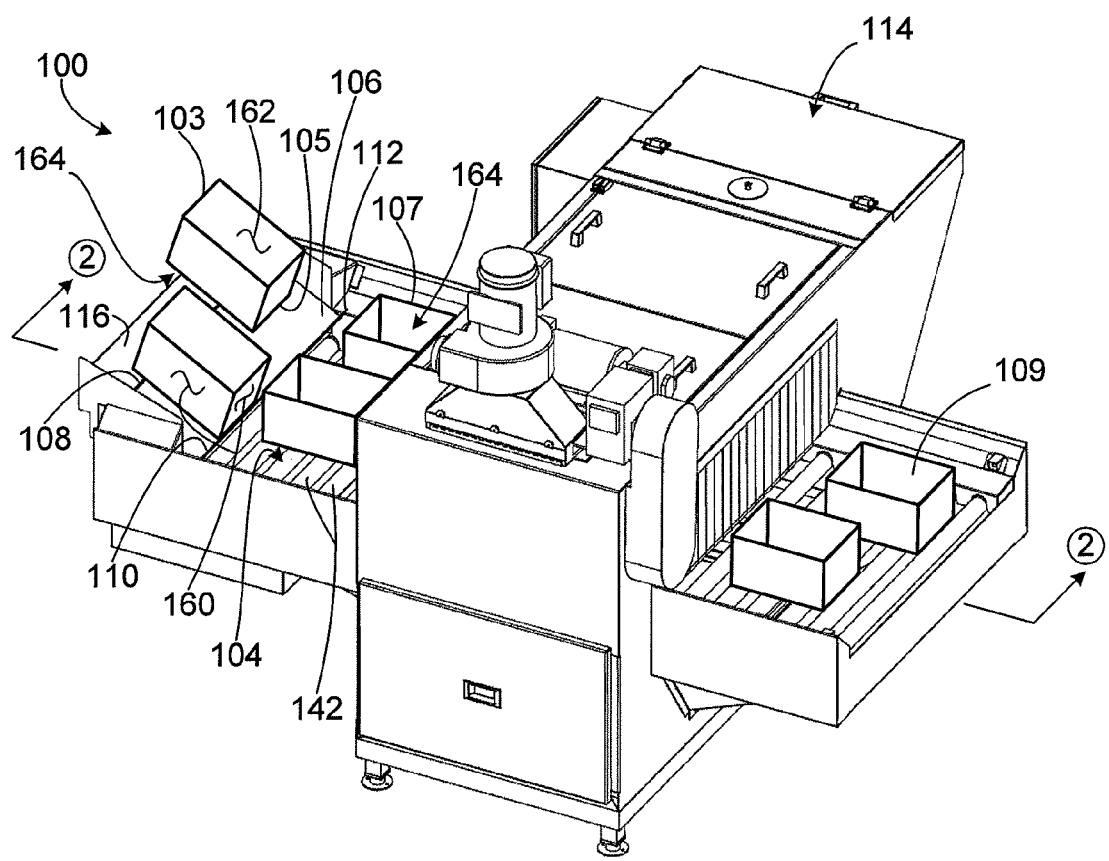
FIG. 1 is a perspective view of an apparatus for changing orientation of a container according to an embodiment of the invention.
Figure 2:
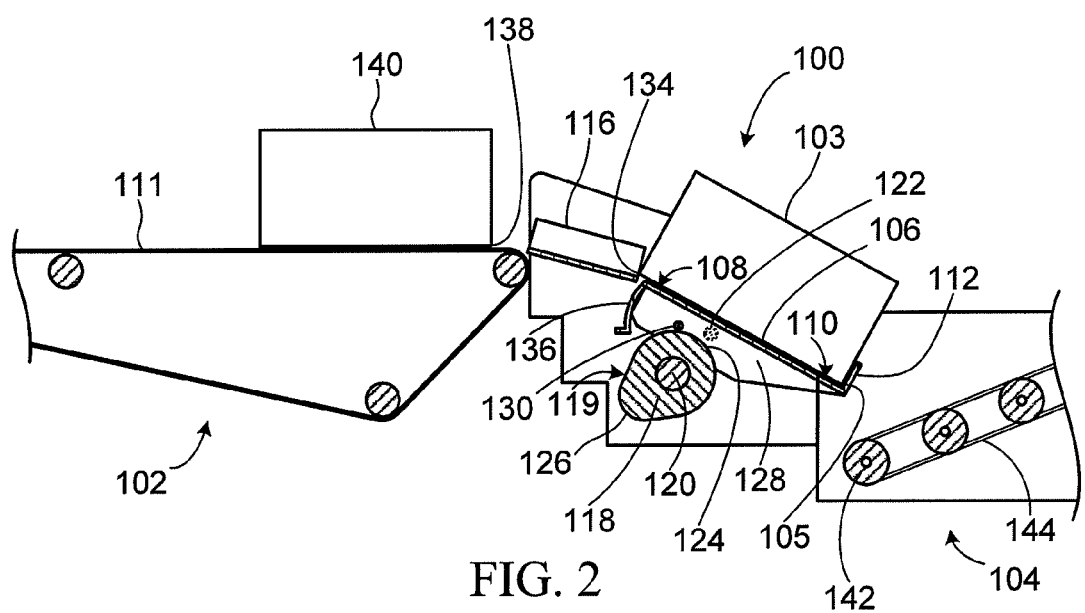
FIG. 2 is a cross sectional view of the apparatus shown in FIG. 1 taken along the lines 2-2.

Referring to FIG. 1, an apparatus for changing orientation of a container according to a first embodiment of the invention is shown generally at 100. The apparatus 100 includes a ramp 106 having a first end 108 and a second end 110. The apparatus 100 is shown in cross section in FIG. 2. Referring to FIG. 2, the ramp 106 is disposed to receive a container 103 from a feed path 102 in a first orientation and to cause the container to be received on a discharge path 104 in a second orientation. In the embodiment shown, the discharge path 104 is an input conveyor of a bedding dispensing apparatus (114) and the feed path 102 comprises a conveyor belt 111.

The ramp 106 is disposed between the feed path 102 and the discharge path 104 to cause the container 103 received from the feed path 102 to slide down the ramp toward the second end 110 of the ramp. The ramp 106 includes an obstruction 112 located at the second end 110 of the ramp, which contacts a leading edge 105 of the container 103 to arrest a sliding motion of the container down the ramp 106. In this embodiment, the obstruction 112 comprises an upwardly oriented lip. Also, in this embodiment, a surface 117 of the ramp 106 has a low friction coefficient that permits the container 103 to slide down towards the second end 110 of the ramp under gravitational forces.

Figure 4:
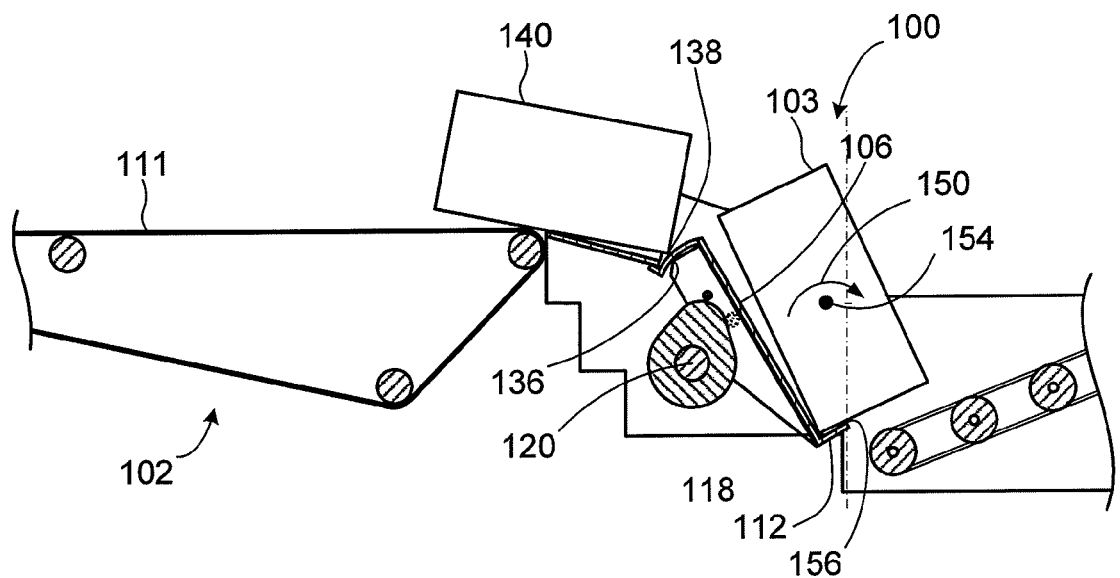
FIG. 4 is another cross sectional view of the apparatus shown in FIG. 1 in a second operational state taken along the lines 2-2.
Figure 5:
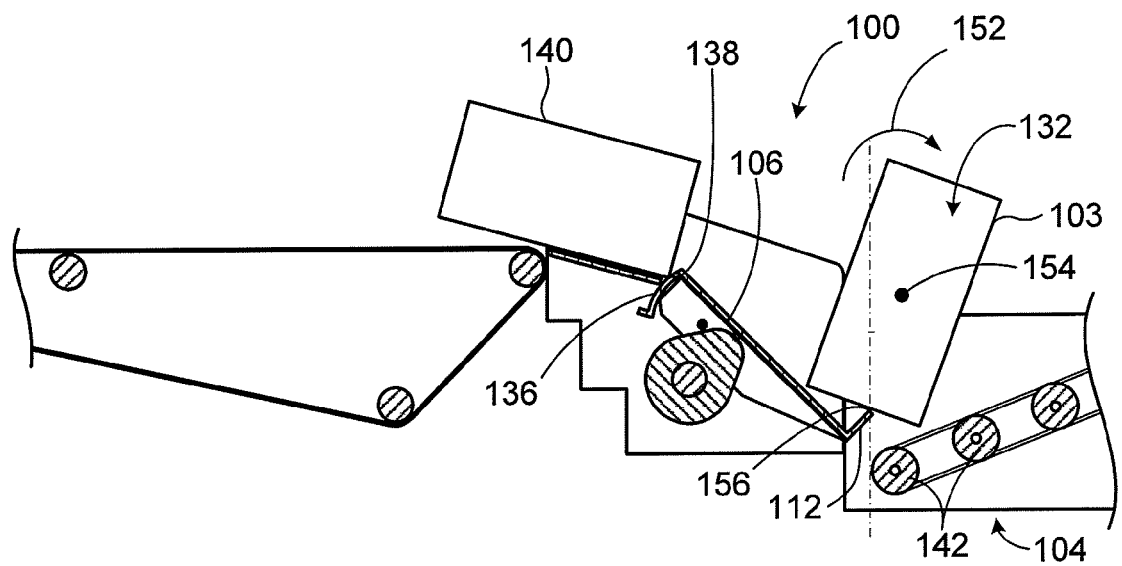
FIG. 5 is a cross sectional view of the apparatus shown in FIG. 1 in a third operational state taken along the lines 2-2.

The ramp 106 is configured to pivot to impart an angular acceleration to the container 103 to provide sufficient angular momentum to cause a center of gravity (COG) of the container 103 to move past a point of support 156 (as shown in FIGS. 4 and 5 and described later herein) causing the container to change orientation such that the container is received on the discharge path 104 in a second orientation. In this embodiment the container 103 includes a base 162, and sidewalls 160 defining an opening 164, and the container is in the first orientation, with the base being upwardly oriented. A container in the second orientation is shown at 107, and in this embodiment the opening 164 of the container 107 is upwardly oriented. The change in orientation facilitates subsequent processing of the container 103 by the bedding dispensing apparatus (114).

Referring back to FIG. 1, the container 107 in the second orientation is ready for subsequent processing. In the embodiment shown such subsequent processing involves dispensing of bedding material by the bedding dispensing apparatus 114. The discharge path includes a plurality of rotating rollers 142 that transport the container 107 into the bedding dispensing apparatus 114 where bedding material is dispensed into the container 107. The bedding material may be a wood fiber product or any other suitable bedding material for housing animals, for example. A container 109 leaving the bedding dispenser apparatus 114 will thus have been provided with a desired quantity of bedding material, and is subsequently unloaded from the apparatus 114 and placed in a cage rack, for example.

In the embodiment shown, adjacent rollers 142 are interconnected by drive belts 144 (shown in FIG. 2). A rotational drive torque provided by a drive motor (not shown) is coupled to one of the plurality of rollers 142 such that other interconnected rollers are rotated generally at the same rotational speed to cause the containers 103 and 107 to move through the bedding dispensing apparatus 114. In the embodiment shown, the discharge path 104 is upwardly inclined (as shown in FIG. 1) which assists in slowing down angular motion of the container 103 while changing orientation, as will be described later herein.

The conveyor belt 111 in the feed path 102 may be an open mesh stainless steel wire conveyor belt of an unload section of a tunnel dryer apparatus (not shown). An exemplary tunnel dryer apparatus is described in commonly owned U.S. patent application Ser. No. 12/325,904, which is incorporated herein in its entirety by reference. The tunnel drier apparatus may be located immediately following a washing apparatus (also not shown), where the container 103 is washed while the opening 164 is oriented downwardly (i.e. in the first orientation in this embodiment) to facilitate draining and drying in a heated drying chamber of the tunnel drier. The container 103 exits the tunnel dryer along the conveyor 111 in a substantially dry condition and in the first orientation. In this embodiment, the exit portion of the unload conveyor belt 111 of the dryer thus forms the feed path 102 for the apparatus 100.

Figure 3:
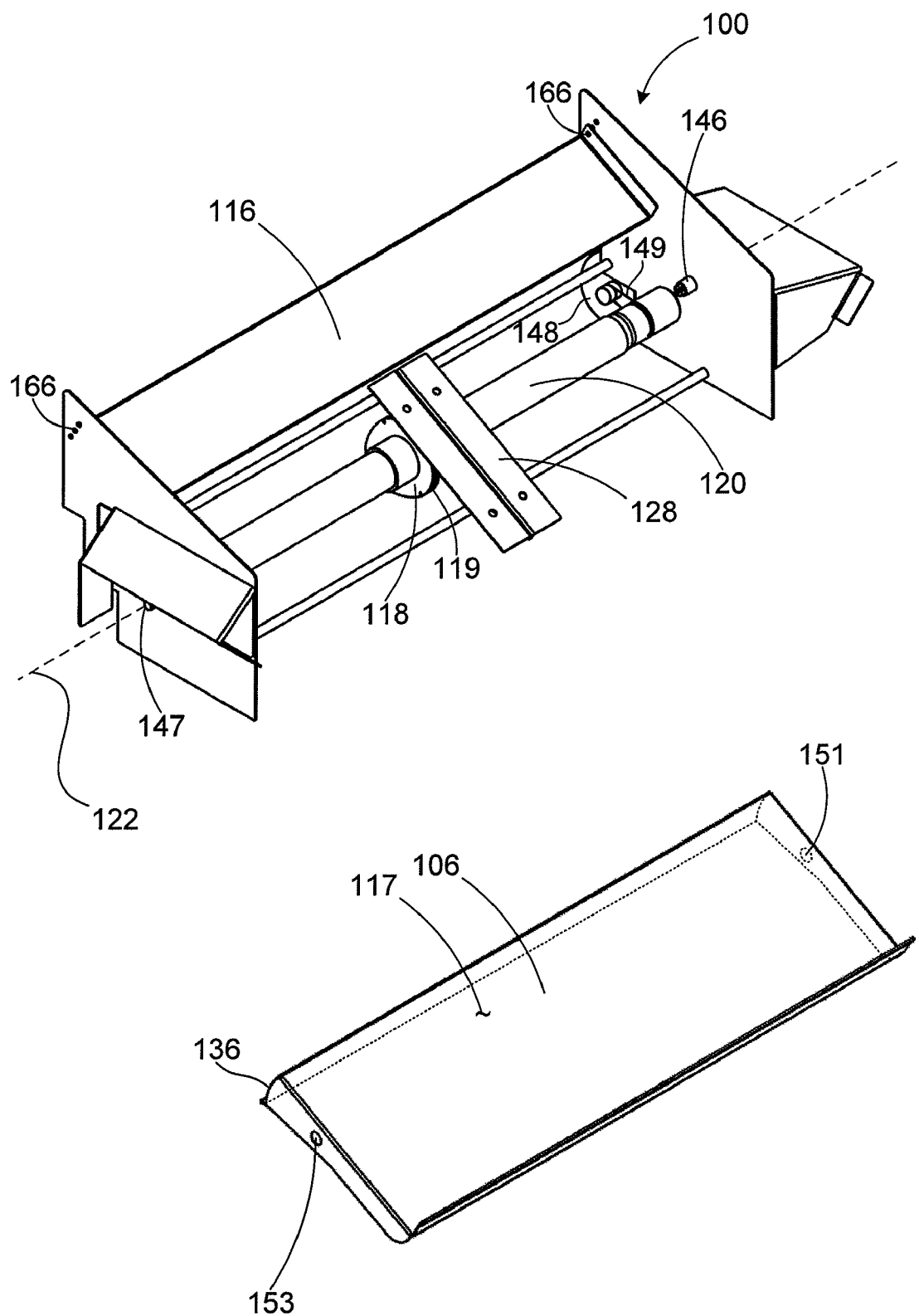
FIG. 3 is an enlarged perspective view of the apparatus shown in FIG. 1 with a ramp removed.

In the embodiment shown, the apparatus 100 also includes a transition ramp 116 disposed between the feed path (102) and the ramp 106. Referring to FIG. 3, the apparatus 100 is shown with the ramp 106 removed. The transition ramp 116 may be selectively located in one of a plurality of different angular dispositions provided by a plurality of openings 166 with respect to the ramp 106, to permit an angular disposition of the container 103 entering the ramp 106 at the first end 108 to be adjusted. Such adjustments of the angle of the transition ramp 116 may be required to provide reliable handling and re-orientation of different sized containers. The transition ramp 116 has a generally low co-efficient of friction to facilitate sliding of the container 103 along the transition ramp.

Still referring to FIG. 3, the apparatus 100 includes pivots 146 and 147 for mounting the ramp 106. In the embodiment shown the pivots 146 and 147 are implemented as shoulder bolts. Corresponding openings 151 and 153 are provided on the ramp 106 for engaging the pivots 146 and 147. The pivots 146 and 147 define a pivot axis 122 located between the first and second ends of the ramp 106 about which the ramp is able to pivot.

The apparatus 100 further includes a rotating cam 118 disposed on a shaft 120. The shaft 120 is coupled to a drive motor 148 for providing a torque for rotating the shaft. In the embodiment shown, the shaft 120 is coupled to the drive motor using a drive belt 149. In other embodiments the drive motor may be directly coupled to an end of the shaft 120. The drive motor 148 is provided with a speed control for adjusting a rotational speed of the shaft 120 and thus the cam 118 for controlling a timing of the pivoting of the ramp as described later herein. Alternatively, the shaft 120 may be interconnected with one of the rollers 142 of the bedding dispensing apparatus 114 and driven by a drive belt 144. The rotating cam 118 includes a cam surface 119. Referring back to FIG. 2, the cam surface 119 includes a generally circular portion 124 and an outwardly projecting eccentric portion 126. The apparatus 100 further includes a cam follower bracket 128 attached to an underside of the ramp 106. The cam follower bracket 128 includes a bearing 130 attached to the cam follower bracket for bearing on the cam surface 119. The bearing 130 provides a low friction mechanical coupling between the cam surface 119 and the follower bracket 128 of the ramp 106.

Still referring to FIG. 2, when the circular portion 124 of the cam surface 119 engages the bearing 130, the ramp 106 remains in a first position and a the first end 108 of the ramp 106 is generally aligned with the surface of the transition ramp 116 to allow the container 103 to be received on the ramp (as shown for the container 103 in FIG. 1). During rotation of the cam 118, when the eccentric portion 126 of the cam surface 119 engages the bearing, the ramp 106 pivots about the axis 122 defined by the pivots 146 and 147 causing the first end 108 to move upwardly, and the second end 110 to move downwardly until an outer extent of the eccentric portion 126 of the cam surface 119 is reached and the ramp comes to a momentary standstill in a second position, before the pivoting motion reverses, returning the ramp 106 to the first position. The shape of the cam surface 119 and a rotational speed of the shaft 120 determine the timing of an angular acceleration of the ramp about the pivot axis 122.

In an alternative embodiment, the rotating cam 118 may be replaced with an actuator such as a pneumatic actuator (not shown) coupled to the underside of the ramp 106 to cause the ramp to pivot about the pivot axis 122 as generally described above.

Still referring to FIG. 2, the ramp 106 also includes a fence portion 136 depending from the first end 108 of the ramp. The fence portion 136 moves to obstruct the feed path when the ramp 106 pivots upwardly and prevents containers, or any portion thereof, from becoming lodged under the first end 108 of the ramp while the ramp is pivoted. In an alternative embodiment, the fence portion 136 may include a plurality of fingers depending from the first end 108 of the ramp 106.

Figure 6:
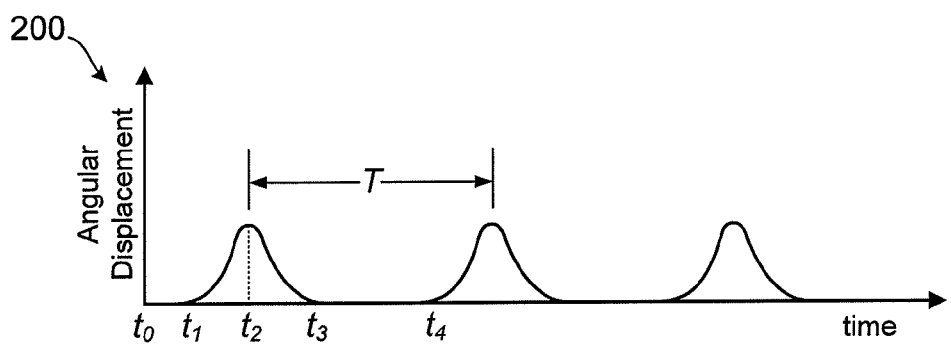
FIG. 6 is a graph showing the angular displacement of the ramp about a pivot axis.

Referring to FIG. 6, a graphical depiction of angular displacement of the ramp 106 about the pivot axis 122 during operation is shown at 200. In the graph 200 angular displacement about the axis 122 is plotted on the y-axis as a function of time. A first sloped portion of the displacement graph represents upward motion of the ramp in response to being contacted by the eccentric portion 126 of the cam surface 119. During this time the ramp 106 accelerates from the first position at a time $t_1$ and comes to a standstill in the second position at a time $t_2$. At time $t_2$ the ramp 106 is momentarily stationary in the second position corresponding to the outer extent of the eccentric portion 126 of the cam surface 119 engaging the bearing. The ramp 106 then reverses direction and begins to accelerate again between time $t_2$ and $t_3$. At time $t_3$ the ramp 106 again comes to a standstill at the first position. The ramp 106 then remains stationary in the first position for a period of time $t_3$ to $t_4$ while the generally circular portion 124 of the cam surface 119 engages the bearing 130.

A time period T between angular displacements may be adjusted by controlling the rotational speed of the shaft 120. In one embodiment a potentiometer (not shown) is provided for providing user control of the shaft rotational speed. Alternatively, rotation of the shaft may be controlled by a motor controller which may be configured in response to user input. The motor controller may be connected to a controller interface for receiving input from the user and transmitting electrical control signals to the motor controller. As described above, the shape of the cam surface 119 may be selected to achieve a desired acceleration/deceleration profile of ramp motion. Generally, increasing a size of the eccentric portion 126 of the cam surface 119 with respect to the circular portion 124 increases the acceleration. The duty cycle T and the acceleration/deceleration profile may be adjusted to accommodate different container size ranges. Similarly, in embodiments that include a pneumatic actuator in place of the cam 118, a rate and period of actuation of the pneumatic actuator may be varied to accommodate different container size ranges.

The operation of the apparatus 100 is described with reference to FIG. 2, FIG. 4, FIG. 5, and FIG. 6. Referring back to FIG. 2, a container 140 traveling along the feed path 102 is advanced toward the transition ramp 116 by the conveyor belt 111. The conveyer belt 111 continues to advance the container along the feed path 102 onto the transition ramp 116, where the container the may tilt to take up an angular disposition matching the angle of the transition ramp, depending on the length of the container. When the ramp 106 is in the first position as described above, the fence portion 136 is disposed below the surface of the transition ramp 116 and the container is able to advance past the transition ramp and slide down the ramp 106 towards the second end 110 of the ramp under gravitational forces. FIG. 1 shows the container 103 in the first orientation after being received on the ramp 106, while the ramp is in the first position. The leading edge 105 of the container 103 has engaged the obstruction 112, thereby arresting the sliding motion of the container.

Referring to FIG. 6, at some time during or after the container 103 has been received on the ramp 106 the ramp will undergo a pivoting motion between time $t_1$ and $t_2$. Referring to FIG. 4, the container 103 has a center of gravity 154, and during acceleration of the ramp 106 between time $t_1$ and $t_2$, the ramp causes the container 103 to accelerate about its center of gravity imparting angular momentum to the container about a point of support 156 causing the container to lift away from the ramp 106 as shown in FIG. 4. The point of support 156 may change as the container 103 pivots away from the ramp. As shown in FIG. 4 the point of support 156 is at the end of the obstruction 112. The center of gravity 154 of the container 103 moves generally in the direction indicated by the arrow 150.

The rotational speed of the shaft 120 may be adjusted to cause the sufficient acceleration of the ramp 106 between time $t_1$ and $t_2$ to impart an angular acceleration to the container 103 that in turn provides sufficient angular momentum to cause the center of gravity 154 of the container to move past the point of support 156.

Referring to FIG. 5, under these circumstances the center of gravity 154 of the container 103 moves past the point of support 156 and the container tips over the end of the obstruction 112. The container 103 continues to move about the point of support 156 in the direction indicated by arrow 152. At this time, the center of gravity 154 of the container 103 has moved past the point of support 156 and the container continues to rotate about the point of support 156 until the container contacts at least one of the rollers 142 on the discharge path 104. In this embodiment where the discharge path 104 is upwardly inclined, a trailing portion 132 of the container 103 is decelerated sooner than would be the case if the discharge path were to be horizontally inclined. Advantageously, the upwardly inclined discharge path 104 may prevent some containers from over-rotating and coming to rest in the first orientation or coming to rest on one of the sidewalls 160 (as shown in FIG. 1). However, in other embodiments the discharge path 104 may be horizontally or otherwise oriented, where over-rotation either does not occur or occurs infrequently. If a particular container over-rotates, the container will not be able to receive the bedding material and will have to be re-processed or re-inserted at some point along the feed path 102.

Referring back to FIG. 2, advantageously, the pivot axis 122 of the ramp 106 is disposed partway between the first and second ends 108 and 110 such that the leading edge 105 and trailing edge 134 of the container 103 are disposed on opposite sides of the pivot axis 122, thereby imparting a sufficient angular momentum to a container sized as shown in relation to the distance between the first and second ends of the ramp 108 and 110. The inventors have found that under such conditions containers of both larger and smaller length dimensions compared to the container 103 will be successfully re-oriented by the ramp 106. For example, a ramp size of 11 inches facilitates re-orienting containers ranging from 11 inches to 28 inches without changing operating conditions.

Referring back to FIG. 4, between times $t_1$ and $t_2$ the fence portion 136 also moves upwardly to obstruct the feed path 102 to prevent a subsequent container 140 from being received on the ramp while the container 103 is changing orientation. In this embodiment, the subsequent container 140 is prevented from entering the ramp 106 while the fence portion 136 is pivoted upwardly and engages the leading edge 138 of the container (as shown in FIGS. 4 and 5). The fence portion 136 also prevents any portion of the subsequent container 140 from becoming lodged under the ramp. When the ramp 106 returns to the first position (i.e. the position of the ramp at $t_2$ shown in FIG. 6), the fence portion 136 moves to a position below the surface of the transition ramp 116 and the subsequent container 140 is received on the ramp 106. Repetitive pivoting motions of the ramp 106, spaced a period T apart cause subsequent containers, such as the subsequent container 140, to be received and re-oriented in the manner described above.

A wide range of different size cages may be used in a single facility. Advantageously, the ramp 106 is operable to re-orient containers having a range of different sizes without requiring special configuration of the apparatus 100. Furthermore the ramp 106 operates on the containers without requiring the containers to have any special engagement features. The range of containers that may be re-oriented may be further extended for processing oversize or undersize containers by adjusting a rotational speed of the shaft and/or an angle of the transition ramp 116.

While specific embodiments of the invention have been described and illustrated, such embodiments should be considered illustrative of the invention only and not as limiting the invention as construed in accordance with the accompanying claims.

What is claimed is:

1. An apparatus for changing orientation of a container moving between a feed path and a discharge path to facilitate subsequent processing of the container, the apparatus comprising:

a ramp having a first end and a second end, said ramp being disposed to receive the container from the feed path in a first orientation and to cause the container to slide down said ramp toward said second end of the ramp;

an obstruction located at said second end of the ramp, said obstruction being operably configured to contact a leading edge of the container to arrest a sliding motion of the container down the ramp;

an actuator coupled to said ramp, said actuator being operable when actuated to cause said ramp to pivot to impart an angular acceleration to the container to provide sufficient angular momentum to cause a center of gravity of the container to move past a point of support causing the container to change orientation such that the container is received on the discharge path in a second orientation.

2. The apparatus of claim 1 wherein said first end of said ramp is operably configured to engage a leading edge of a subsequent container to prevent said subsequent container from being received on the ramp while the container is changing orientation.

3. The apparatus of claim 2 further comprising a fence portion depending from said first end of said ramp, said fence portion being operably configured to obstruct the feed path when said ramp is pivoted.

4. The apparatus of claim 1 wherein the feed path comprises a discharge conveyor of a dryer apparatus.

5. The apparatus of claim 1 further comprising a transition ramp disposed between the feed path and said ramp.

6. The apparatus of claim 1 wherein the discharge path comprises an upwardly inclined discharge path.

7. The apparatus of claim 1 wherein said ramp is operably configured to pivot about a pivot axis located between said first and second ends of said ramp.

8. The apparatus of claim 1 wherein said actuator comprises a rotating cam having a projection operable to engage an underside of said ramp to cause said ramp to pivot.

9. The apparatus of claim 8 wherein said projection is operably configured to engage a cam follower mounted on said underside of said ramp.

10. The apparatus of claim 9 wherein said cam comprises a cam surface having a generally circular portion and an eccentric portion, said eccentric portion acting as said projection and the apparatus further comprises a bearing mounted on said ramp and operably configured to bear on said cam surface.

11. The apparatus of claim 8 wherein said rotating cam comprises a cam disposed on a shaft to be rotated at a rotational speed to cause said pivoting of said ramp to occur at a time interval corresponding to a range of sizes of containers.

12. The apparatus of claim 11 further comprising a controller operably configured to control a rotational speed of said rotation shaft in response to user input to cause said pivoting of said ramp to occur at said time interval.

13. The apparatus of claim 7 wherein a trailing edge and said leading edge of the container are disposed on opposite sides of said pivot axis such that sufficient momentum is imparted to a trailing portion of said container to cause said change in orientation.

14. The apparatus of claim 1 wherein said obstruction comprises a generally upwardly oriented lip operably configured to engage a portion of a surface of the container adjacent said leading edge.

15. An apparatus for changing orientation of a container moving between a feed path and a discharge path to facilitate subsequent processing of the container, the apparatus comprising:
  means for receiving the container from the feed path in a first orientation at a first end of a ramp, the ramp being disposed to cause the container to slide down the ramp toward a second end of the ramp;
  means for arresting a sliding motion of the container down the ramp; and
  means for actuating said ramp to cause said ramp to pivot to impart sufficient angular momentum to the container about a point of support to cause the container to change orientation such that the container is received on the discharge path in a second orientation.

16. A method for changing orientation of a container moving between a feed path and a discharge path to facilitate subsequent processing of the container, the method comprising:
  receiving the container from the feed path in a first orientation at a first end of a ramp, the ramp being disposed to cause the container to slide down the ramp toward a second end of the ramp;
  causing a sliding motion of the container down the ramp to be arrested at an obstruction located at the second end of the ramp, the obstruction being disposed to contact a leading edge of the container; and
  actuating an actuator coupled to said ramp to cause said ramp to pivot to impart an angular acceleration to the container to provide sufficient angular momentum to cause a center of gravity of the container to move past a point of support causing the container to change orientation such that the container is received on the discharge path in a second orientation.

17. The method of claim 16 wherein causing said ramp to pivot comprises simultaneously causing said first end of said ramp to engage a leading edge of a subsequent container to prevent said subsequent container from being received on the ramp while the container is changing orientation.

18. The method of claim 17 wherein causing said first end of said ramp to engage said leading edge of said subsequent container comprises causing a fence portion depending from said first end of said ramp to obstruct the feed path when said ramp is pivoted.

19. The method of claim 16 wherein receiving the container comprises receiving the container from a feed path comprising a discharge conveyor of a dryer apparatus.

20. The method of claim 16 wherein receiving the container comprises receiving the container on a transition ramp disposed between the feed path and said ramp.

21. The method of claim 16 wherein causing the container to be received on the discharge path comprises causing the container to be received on an upwardly inclined discharge path.

22. The method of claim 16 wherein causing said ramp to pivot comprises causing said ramp to pivot about a pivot axis located between said first and second ends of said ramp.

23. The method of claim 16 wherein actuating said actuator comprises causing a projecting portion of a rotating cam to engage an underside of said ramp.

24. The method of claim 23 wherein causing said projecting portion of said rotating cam to engage said underside of said ramp comprises causing said projecting portion to engage a cam follower mounted on said underside of said ramp.

25. The method of claim 24 wherein said cam comprises a cam surface having a generally circular portion and an eccentric portion, said eccentric portion acting as said projecting portion, and wherein causing said projecting portion to engage said cam follower comprises causing a bearing mounted on said ramp to bear on said cam surface.

26. The method of claim 23 wherein causing said projecting portion of said rotating cam to engage said underside of said ramp comprises causing a cam disposed on a shaft to be rotated at a rotational speed to cause said pivoting of said ramp to occur at a time interval corresponding to a range of sizes of containers.

27. The method of claim 26 wherein causing said pivoting of said ramp to occur at said time interval comprises controlling a rotational speed of said rotation shaft in response to user input.

28. The method of claim 22 wherein imparting sufficient angular momentum to the container about said leading edge comprises causing the container to be arrested such that a trailing edge and said leading edge of the container are disposed on opposite sides of said pivot axis such that sufficient momentum is imparted to a trailing portion of said container to cause said change in orientation.

29. The method of claim 16 wherein causing said sliding motion of the container to be arrested at said obstruction, comprises causing the sliding motion of the container to be arrested at a generally upwardly oriented lip operably configured to engage a portion of a surface of the container adjacent said leading edge.

30. The method of claim 29 wherein imparting said angular acceleration to the container comprises controlling a rate of acceleration of said ramp to provide said angular momentum.

31. The method of claim 30 further comprising controlling a time interval between successively causing said ramp to pivot to impart said acceleration, said time interval selected to provide sufficient time for the container to change orientation.

32. The apparatus of claim 1, wherein said actuator comprises a pneumatic actuator.

33. The method of claim 16 wherein actuating said actuator comprises actuating a pneumatic actuator coupled to said ramp.

* * * * *